July 27, 1948.  L. R. BUCKENDALE  2,445,760
POWER TRANSMITTING MECHANISM
Filed March 13, 1943  3 Sheets-Sheet 1
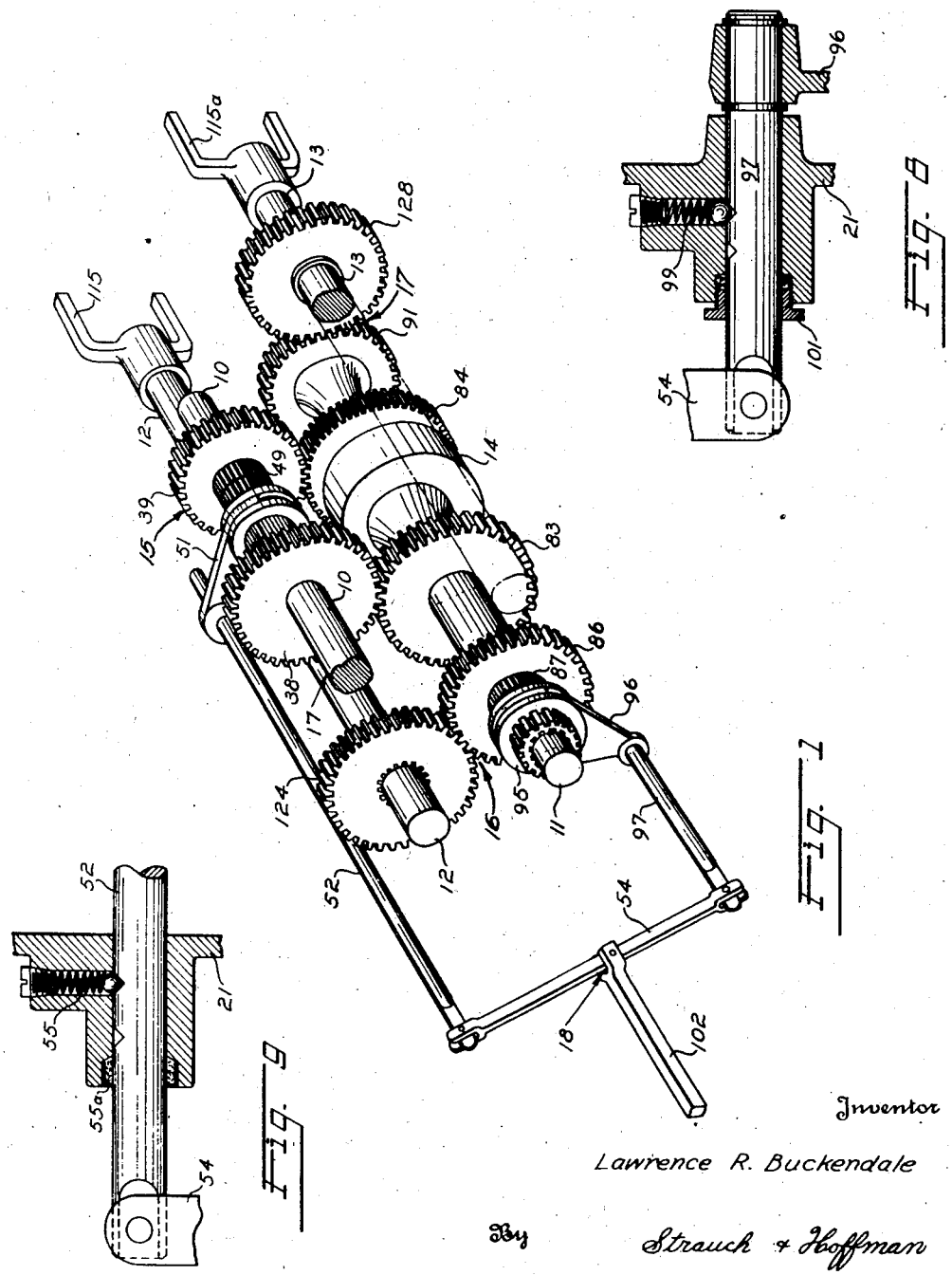
Inventor
Lawrence R. Buckendale
By Strauch & Hoffman
Attorneys

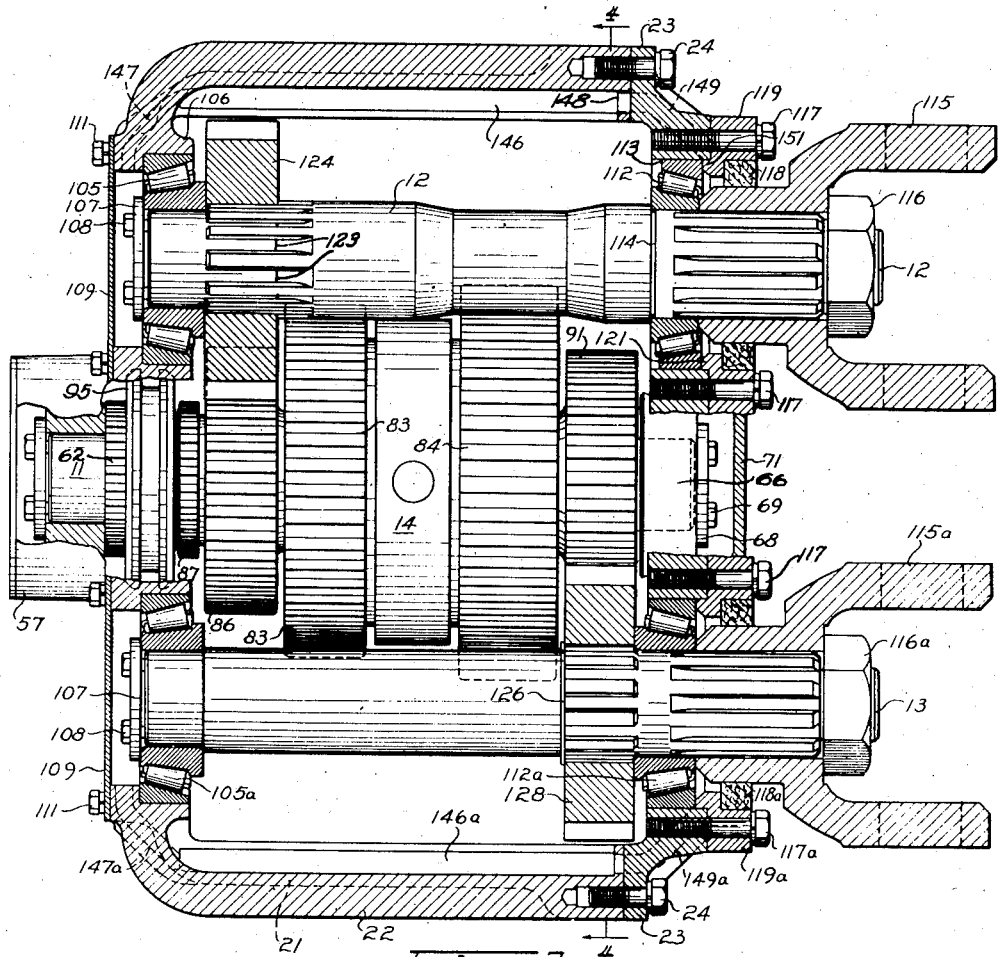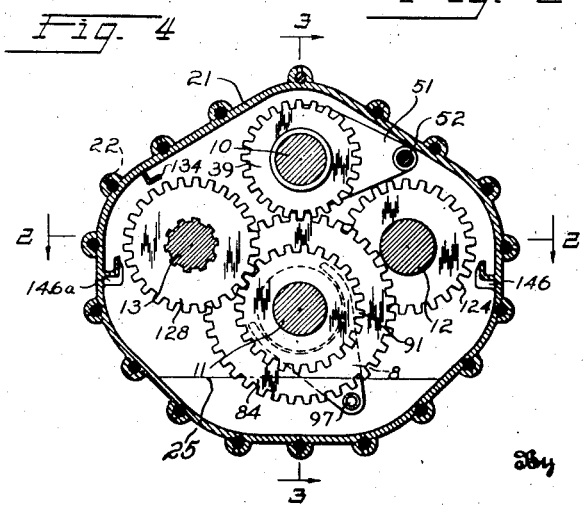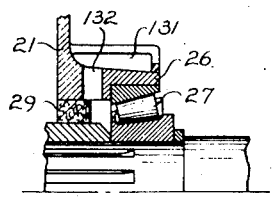

July 27, 1948.　　　L. R. BUCKENDALE　　　2,445,760
POWER TRANSMITTING MECHANISM
Filed March 13, 1943　　　3 Sheets-Sheet 3
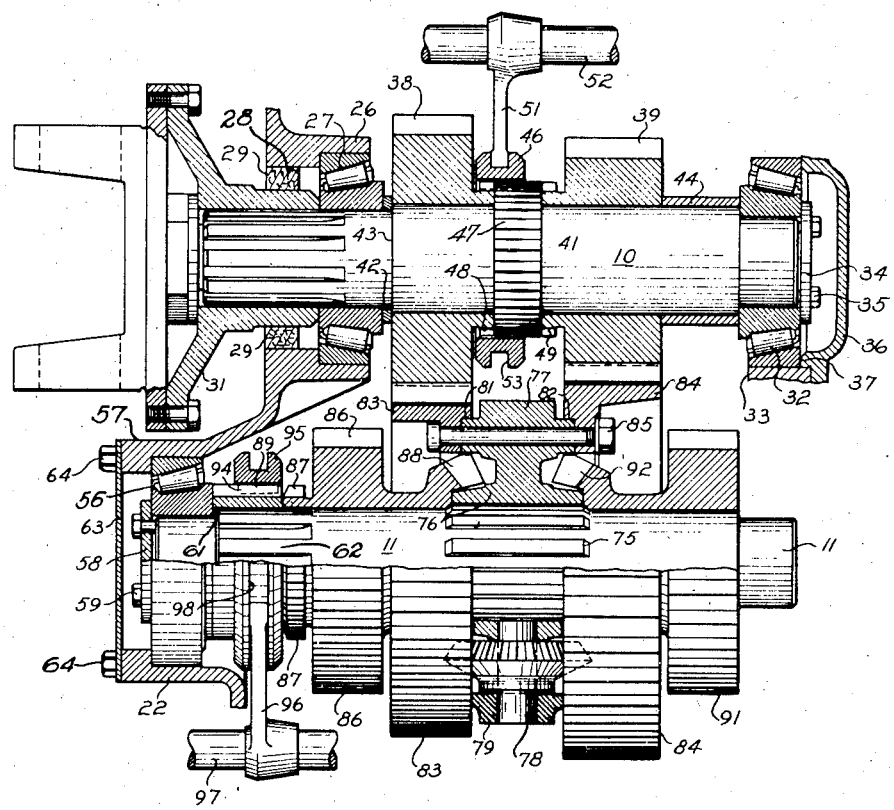
Inventor
Lawrence R. Buckendale
By Strauch & Hoffman
Attorneys Patented July 27, 1948

2,445,760

UNITED STATES PATENT OFFICE 2,445,760

POWER-TRANSMITTING MECHANISM

Lawrence R. Buckendale, Detroit, Mich., assignor to The Timken-Detroit Axle Company, Detroit, Mich., a corporation of Ohio Application March 13, 1943, Serial No. 479,086

14 Claims. (Cl. 74—327)

1

The present invention relates to power transmitting mechanisms, and more particularly to two-speed transmissions known in the art as transfer cases, for driving the two propeller shafts of tandem drive axles, and embodying a differential mechanism for dividing the torque, although it is not limited to such use.

While transfer cases of this general character have gone into rather wide use in recent years, they have not been as satisfactory as desired, and have often given trouble in the field. Due to the design of the transfer cases heretofore proposed, the output shafts rotate oppositely to the input shaft, with the result that either specially designed or inverted drive axles must be used, and in those cases which embody a differential lockout and a speed ratio changing mechanism it is necessary to employ complicated controls for shifting the speed ratios and locking the differential; it is necessary to maintain a large body of lubricant in the housing, and even then lubrication of the various units sometimes fails, particularly when ascending or descending steep grades; the differential is so located in the housing as to render it extremely difficult to lubricate; and the relative positions of the input and output shafts is such that it is impossible to lay out a vehicle drive that will give the most desirable shafting arrangement.

I have found that by providing a transfer case embodying an input shaft located above and parallel to an idler shaft carrying a differential mechanism; a pair of spaced parallel output shafts located either side of the input shaft and located in a horizontal plane intermediate the level of the input and idler shafts; driving the differential spider directly from the input shaft by a two-speed selective gear mechanism; transmitting power from the differential side gears simultaneously to the two output shafts by spur gear assemblies; and providing a mechanism for shifting the gear mechanism into either high or low speed, and also operable to lock the differential whenever the gear mechanism is shifted into low speed, a transfer case of exceptionally simple, yet efficient and rugged, design is achieved, in which a single, two-speed gear mechanism transmits power to both output shafts through the differential mechanism, and effects rotation of the output shafts in the same direction as the input shaft; the shafts are so placed as to make possible the utilization of more efficient vehicle drive shafting arrangements than have heretofore been possible, and efficient lubrication of the various shafts and gears is provided at all times,

2 with a relatively low oil level and minimum agitation, even when the case is materially tilted, as for instance when the vehicle is ascending or descending steep grades.

It is accordingly the major object of this invention to provide a novel transfer case embodying a differential for dividing the torque between the two output shafts, and a single multi-speed gear mechanism for transmitting power to the differential, the gearing and shafting effecting rotation of the output shafts in the same direction as the input shaft.

A further important object is to provide a transfer case having a top power input shaft; a bottom idler shaft; and a pair of output shafts symmetrically disposed either side of the input and idler shafts and driving a differential mechanism on the idler shaft by means of a two-speed selective shift mechanism on the input shaft, thereby providing a device of compact design, with the shafts so located as to provide efficient vehicle drive arrangements.

A further object is to provide a novel transfer case in which the differential mechanism and other parts are constantly lubricated with a sump type oiling system, utilizing a relatively low oil level, with a minimum of lubricant agitation and susceptibility to lubrication failure in response to tilting of the transfer case, as for instance when ascending or descending steep grades.

Another object is to provide a transfer case with a high and low speed gear mechanism and a differential mechanism for transmitting power from the input shaft to the two output shafts and a device for locking the differential whenever the gear mechanism is shifted into the low speed.

A further object is to provide, in a transfer case, novel means for collecting lubricant, thrown by the gears and other rotating parts, and conducting it by gravity to the various bearings and other working parts, insuring adequate lubrication at all times.

Further objects will become apparent as the specification proceeds in conjunction with the annexed drawings, and from the appended claims.

In the drawings:

Figure 1 is an isometric diagrammatic view illustrating the shaft and gearing arrangement of the transfer case of the invention, the bearings and housing being omitted to simplify the disclosure;

Figure 2 is a horizontal sectional view taken substantially on the line 2—2 of Figure 4, looking in the direction of the arrows;

Figure 3 is a vertical sectional view taken substantially on the line 3—3 of Figure 4 looking in the direction of the arrows, a portion of the casing being omitted to simplify the disclosure, and the shifting fork being shown in phantom lines displaced approximately 90° out of its proper position, to clarify the disclosure;

Figure 4 is a transverse vertical sectional view through the mechanism taken substantially on the line 4—4 of Figure 2;

Figure 5 is a fragmental sectional view illustrating the manner in which the lubricant is fed to the front bearing of the input shaft;

Figure 6 is a fragmental sectional view illustrating the manner in which lubricant is conducted to the rear bearing of the input shaft;

Figure 7 is a rear view of the case showing the manner in which lubricant is supplied to the rear end of the idler shaft;

Figure 7A is a fragmental sectional view taken on the line 7A—7A of Figure 7.

Figure 8 is a fragmental sectional view showing the manner in which the differential shifter is mounted in the housing; and Figure 9 is a fragmental sectional view showing the manner in which the front end of the high and low speed shifter rail is mounted in the housing.

With continued reference to the drawings, in which like reference characters have been employed to designate similar parts throughout the several views thereof, and referring first to Figure 1, wherein the shaft and gear arrangement of the mechanism is diagrammatically illustrated, I have found that by providing a transfer case embodying an input shaft 10, located substantially vertically above, and parallel to, an idler or intermediate shaft 11; a pair of spaced parallel output shafts 12 and 13, located preferably symmetrically either side of the vertical plane of the input and idler shafts and in a horizontal plane at a level intermediate the input and idler shaft levels, and mounting a differential mechanism 14 on the idler shaft; driving the differential spider thereof directly from the input shaft by a two-speed selective gear mechanism 15; transmitting power from the differential side gears simultaneously to the two output shafts by spur gear assemblies 16 and 17; and providing a linkage 18 for shifting the gear mechanism into either the high or low speed, and also operable to lock the differential whenever the gear mechanism is shifted into the low speed, and also providing novel lubricating means, to be hereinafter described, a transfer case of exceptionally simple, yet efficient and rugged, design is achieved, in which a single two-speed gear mechanism transmits power to both output shafts through a differential mechanism; the shafts so placed as to make possible the utilization of a more efficient drive shafting arrangement than has heretofore been possible, with the output shafts rotated in the same direction as the input shaft, and efficient lubrication of the various shafts and gears is provided at all times, with a relatively low lubricant level and lubricant agitation, even when the housing is materially tilted, as for instance when the vehicle equipped with the transfer case is ascending or descending steep grades.

Referring now to Figures 2 and 3, the mechanism is enclosed in a casing or housing preferably made up of a deep section or housing 21, having longitudinally extending external reinforcing ribs 22, and a shallow section or cover 23, secured to the housing by cap screws 24, as seen in Figure 2. As seen in Figure 4, the bottom of the housing is of trough-like form, and lubricant is adapted to be maintained therein, preferably at the level indicated by the line 25, suitable lubricant supplying and draining plugs (not shown) being provided in well known manner. The upper portion of the housing is of inverted trough-like form and closely encloses the gears, various lubricant trapping troughs and conducting passages being provided in the housing and the cover, as will be hereinafter described, for feeding lubricant to the various bearings.

Referring now to Figure 3, the front end of casing 21 is provided with a bearing supporting flange or seat 26, in which a tapered roller bearing 27 is mounted in well known manner and journals the front end of input shaft 10. Secured to the front end of the input shaft, and having a hub 28 cooperating with a seal 29 carried by the housing, is a universal joint bolting flange 31, to which power may be applied in any well known manner, as for instance by means of the output shaft of the vehicle transmission, or other prime mover.

The rear end of the input shaft is journalled in a bearing 32 carried in a bearing support 33 formed in cover 23, the bearing being held on the shaft by means of a plate 34 and cap screws 35. A cover plate 36 bolted to cover 23 closes the opening in the cover (Figure 6), and has a flange 37 cooperating with the outer race of bearing 32, to maintain it in proper adjusted position, it being understood that the cap just described, and the other analogous caps that will be described hereafter, may be adjusted by shimming to provide the proper endwise bearing adjustment, in well known manner.

The high and low gear assembly comprises a high speed spur drive pinion 38 and a low speed spur drive pinion 39 journalled on the input shaft either side of a boss 41, the pinions are limited in their endwise movement away from the boss by a collar 42 clamped between the inner race of bearing 27 and a shoulder 43 on the shaft, and a collar 44 is disposed on the shaft between the inner race of bearing 32, and the side face of gear 39.

The drive pinions are adapted to be selectively coupled to the input shaft by means of a clutch 46 having two sets of internal teeth meshing with external teeth 47 on the shaft boss, and slidable endwise into engagement with either clutch teeth 48 on high speed pinion 38, or clutch teeth 49 on low speed pinion 39.

While the invention is not limited to any particular form of jaw clutch mechanism, it is preferably constructed in accordance with the disclosure of Brownyer Patent No. 2,398,407 issued April 16, 1946 for Power transmission mechanism, in which the end faces of the clutch collar teeth, and the end faces of clutch teeth 48 and 49 on the drive pinions are formed perfectly square, or normal to axis of the input shaft, so that when they are shifted into engagement in a pre-selecting operation under predetermined pressure, the end faces will smoothly slide upon each other until substantially complete synchronization is effected, at which time the clutch will shift into the selected gear without shock or clash. For further details of the preferred clutch arrangement employed reference may be made to the aforementioned Brownyer patent.

The clutch collar is preferably controlled by a shifter fork 51 carried by a shaft 52 and riding in a groove 53 in the clutch collar. Shaft 52 is mounted for endwise sliding movement in aligned apertures in the transfer case housing and cover and projects through the front of the housing, as seen in Figure 9, a spring-pressed detent 55 cooperating with notches in the rail to hold it in either of its shifted positions, and a seal 55a cooperating with the rail to preclude lubricant leakage. Rail 52 is pivotally connected to a transverse actuating bar or lever 54, for actuation in a manner to be presently described.

The front end of idler or intermediate shaft 11 is journalled in a bearing 56 carried in a hollow open ended nosing or extension 57 of housing 21. The inner bearing race is clamped between a plate 58, secured on the end of the shaft by cap screws 59, and a collar 61, the latter abutting the ends of splines 62 formed in the shaft. The open end of nosing 57 is closed by a closure plate 63, secured in place by cap screws 64.

The rear end of the idler shaft is journalled in a bearing 66 carried in a bearing support formed on cover 23, the bearing being secured on the shaft by a plate 68 and cap screws 69, and the open end of the bearing support being closed by closure plate 71 secured to the cover by cap screws 72, and having a pilot portion 73 engaging the outer bearing race.

As previously explained, the idler or intermediate shaft carries the differential mechanism, including gear means for transmitting power simultaneously to the two output shafts, and the parts are preferably constructed as will now be set forth.

*Differential mechanism*

Mounted upon a centrally splined portion 75 of the idler shaft is the hub 76 of a rotatable structure or rotor 77, carrying a plurality of radial differential spider shafts 78, upon which differential miter gears 79 are journalled. Rotor 77 also is provided with piloting surfaces 81 and 82, upon which high and low speed spur gears 83 and 84, respectively, are piloted. The gears are also provided with web portions which are rigidly secured in place against side bolting faces of rotor 77 by bolting assemblies 85, as seen in Figure 3.

Referring to Figure 3, it is apparent that gears 83 and 84 constantly mesh with drive pinions 38 and 39, respectively, and accordingly by shifting clutch 46 to the right or to the left structure 77 and idler shaft 11 may be driven at either the high or low speed, respectively, and the power so transmitted is adapted to be transmitted to the two output shafts, with torques of equal magnitude in the manner now to be described.

Journalled on the idler shaft ahead of rotor 77 is drive pinion 86, having a set of external clutch teeth 87, and also embodying preferably integral differential side gear 88, which meshes with miter gears 79. Rearward movement of gear 86 is limited by engagement with hub 76 of the rotor and movement in the opposite direction is limited by engagement with an internally and externally splined collar 89, which in turn abuts the inner race of bearing 56. The internal splines of said collar coact with splines 62 so that the collar rotates as a unit with shaft 11.

Freely journaled on shaft 11 to the rear of rotor 77 is a drive pinion 91, having an integral differential side gear 92 meshing with miter gears 79, the assembly being mounted for limited endwise movement between the hub of the rotor and the inner race of bearing 66.

From the structure so far described, it is apparent that power transmitted to rotor 77 by either gear 83 or gear 84 will be delivered with torques of equal magnitude by way of spider shafts 78 and miter gears 79 to drive pinions 86 and 91. When it is desired to develop high traction, as for instance when operating in low gear over soft terrain, means are preferably provided for locking out or rendering the differential mechanism ineffective, as will now be described.

*Differential lock*

Mounted for axial sliding movement on the external teeth of member 89, and having internal teeth 94 adapted to be meshed with clutch teeth 87 of gear 86, is a clutch member 95. With the clutch member 95 in the position shown in Figure 2, the differential is in operative condition, and power will be transmitted with equal torques to the two drive pinions. When it is desired to lock out the differential, clutch member 95 is shifted to the right in Figure 2, into mesh with clutch teeth 87 thereby locking gear 86 to shaft 11, which, through the medium of rotor 77 and the miter gears, also locks gear 91 for unitary rotation with idler shaft 11, insuring positive transmission of synchronous rotation to both output shafts, with no equalization of torque.

Clutch collar 95 is controlled by a shifter yoke 96 mounted on a shifter rail 97 and having a shift fork engaging a groove 98 in the collar. Mounted for endwise sliding movement in the end wall of the housing, as seen in Figure 8, is a spring pressed detent 99 coacting with notches in the shifter rail to yieldingly hold the latter in one or the other of its shifted positions. Also, a seal, in the form of a packing gland assembly 101, is preferably associated with the rod to preclude escape of lubricant from the housing. Pivotally connected to the end of shifter rail 97 is the lower end of actuating member 54, as seen in Figures 1 and 8.

*Control mechanism*

While the shifter rails may be actuated independently, they are preferably conjointly actuated by means of lever 54 and an actuating lever 102, which is connected to member 54 intermediate its ends. Member 102 may be actuated in any suitable manner, preferably by a control mechanism operated from the vehicle cab, it being observed that when member 102 is shifted rearwardly, or to the right in Figure 1, lever 54 will actuate shifter rail 52 to engage clutch member 46 with clutch teeth 49 of the low speed pinion, and will substantially simultaneously actuate shifter rail 97 to engage clutch member 95 with teeth 87 of gear 86, thereby simultaneously placing the transmission in the low speed gear and locking out the differential. The novel floating yoke or lever 54 is preferably employed inasmuch as should one of the clutches engage the ends of the clutch teeth and become temporarily "blocked," this will not interfere with engagement of the other clutch, and when the blocked teeth are brought into mesh it will then engage.

When actuating member 102 is shifted in the opposite direction, it disengages both clutches and restores the mechanism to the condition shown in Figures 2 and 3, with the gear mechanism disposed in the high ratio, and with the differential in unlocked condition. With the shift mechanism in the aforementioned Brownyer patent incorporated in clutch 46, the shift in either direction may be readily carried out without disengaging the vehicle clutch by merely momentarily releasing the accelerator and applying a shifting force of predetermined magnitude to member 102, which will insure shifting of the parts into mesh at the instant of synchronization, without clash or shock, and rocking lever 54 will prevent the differential clutch from interfering with the shift operation.

Final Drive

Output shafts 12 and 13 are journalled in the housing and the cover and are driven by drive pinions 86 and 91 in the manner now to be set forth.

The front end of shaft 12 is journalled in a bearing 105 carried in a bearing seat 106 in the housing, the inner race of the bearing being secured thereto by a plate 107 and cap screws 108. The open end of the bearing seat is closed by a plate 109 secured to the housing by cap screws 111. The rear end of shaft 12 is journaled in a bearing 112 carried in a bearing seat 113 in cover 23, the inner race of the bearing being clamped between a shoulder 114 on the shaft and the hub of a universal joint coupling 115 secured to the shaft by a nut 116. Secured to cover 23 by cap screws 117, and carrying a seal 118 cooperating with the hub of coupling 115, is a ring 119 having a flange 121 abutting the outer race of the bearing.

Clamped between the inner race of bearing 105 and a shoulder 123 on a splined section of the shaft is a gear 124, which constantly meshes with drive pinion 86 on the idler shaft.

Output shaft 13 is journaled in the housing and cover in substantially identically the same manner as shaft 12, and therefore similar reference characters, with the subscript "a," have been employed to designate the corresponding parts, and they will not be further described.

Clamped between a shoulder 126 and the inner race of bearing 112a on a splined portion of shaft 13 is a spur gear 128 which, as seen in Figure 2, constantly meshes with drive pinion 91 on the countershaft.

Operation

Assuming that the clutches are disposed in the respective positions shown in Figures 2 and 3, and power is applied to shaft 10, power is transmitted through clutch 46 to high speed pinion 38, and the latter drives spur gear 83 and rotor 77 at relatively high speed. The miter gears in turn transmit power simultaneously to drive pinions 86 and 91, with torques of equal magnitude, and the latter, through spur gears 124 and 128, respectively transmit the divided power to shafts 12 and 13.

From Figure 1, in which the direction of rotation of the various parts is indicated, it is apparent that by reason of the novel shaft and gear arrangement disclosed, the two output shafts are driven in the same direction as the input shaft 10, with the result that it is possible to employ conventional bevel or hypoid rear axles for tandem drive units, without resorting to the use of inverted or specially designed axle constructions to give opposite rotation. Also, by locating the output shafts symmetrically either side of the vertical plane of the input shaft, and dropping them materially below the level thereof, it is possible to apply power to the units substantially at the level of the vehicle transmission or other source of power, and take power from the two output shafts at a sufficiently lower level to materially reduce propeller shaft angularity in the drive to the rear axles. Also, the material spacing of the output shafts from each other largely eliminates shaft angularity in a horizontal plane.

Assuming that it is now desired to shift into low speed, actuating rod 102 is shifted rearwardly, after momentarily releasing the vehicle accelerator to interrupt the torque, and thereafter bringing clutch 48 into engagement with clutch teeth 49 of drive pinion 39, and meshing the teeth of clutch 95 with clutch teeth 87 of drive pinion 86. Under these conditions, power is transmitted from input shaft 10 to low speed pinion 39, which in turn drives low speed gear 84 and rotor 77 at relatively low speed. Since under these conditions drive pinion 86 is locked to shaft 11, drive pinions 86 and 91 are locked together and transmit power to the two output shafts without equalizing the torque, which is very desirable under conditions requiring high traction.

It should be particularly observed that, when the mechanism is operating in either high or low speed, a single, two-speed mechanism is employed, driving through the same differential, thereby providing a structure of extremely simple and yet efficient design.

Vehicle drive arrangements

The embodiment of the invention disclosed is intended to be interposed between the selective speed transmission and the two propeller shafts of a vehicle having two rear driving axles, with one propeller shaft connected to coupling 115 and the other propeller shaft connected to coupling 115a, it being noted that, since both propeller shafts rotate in the same direction as the output shaft from the transmission, it is possible to employ conventional bevel or hypoid rear axles.

It is to be understood that if desired, however, either of the output shafts 12 or 13 may be extended through the front of the housing and be coupled to the propeller shaft of a front axle, in either a six-by-four or a six-by-six vehicle, without departing from the spirit of the invention. If a four wheel drive vehicle is involved, the rear end of the unused propeller shaft may be capped over if desired. Also, if desired a simple declutch mechanism may be associated with the front propeller shaft, for disconnecting the drive to the front wheels at will.

Lubrication

By reason of the location of the differential in the bottom of the housing, gear 84 dips into the lubricant during operation in either gear ratio and constantly splashes oil over rotor 77 and into the passages thereof, efficiently lubricating miter gears 79 and their journals on spiders 78.

The front end of the input shaft is lubricated by means of a pocket 131, preferably integrally cast with bearing support 26, which, as seen in Figure 5, faces upwardly to catch lubricant draining downwardly from the housing, and has a port 132 for conducting the collected oil to the space between seal 29 and bearing 27, thereby efficiently lubricating the latter. Pocket 131 is preferably located opposite gear 124 as shown in Figure 2, so that it will catch lubricant thrown thereby.

The rear end of the input shaft is lubricated as seen in Figure 6, by means of a short trough 134, preferably integrally cast with the housing side walls and extending from a position opposite gear 128 to the plane of the mating housing sections where it communicates with a trough 135 formed on housing cover 23. Trough 135 in turn communicates with a port 136 in bearing support 33, and the latter registers with a notch 137 in pilot flange 37. The collected oil is fed accordingly to the space between bearing 32 and cap 36, the spent oil passing through the bearing and returning to the body of lubricant in the bottom of the housing.

The front end of the idler shaft 11 is lubricated by splash, and the spent oil collecting behind bearing 56 is returned to the sump by way of a passage in housing nosing 57 (not shown).

The rear end of the idler shaft is lubricated, as seen in Figure 7, by means of an upwardly facing pocket 142, preferably integrally formed with bearing support 67, and communicating with a duct 143 in the latter. Duct 143 registers with a notch 144 in pilot flange 73 of cap 71, whereby lubricant is conducted to the space between bearing 66 and the cap 71.

The bearings for the front and rear ends of output shafts 12 and 13 are lubricated by substantially identically constructed oil collecting troughs and duct assemblies, so only the one associated with output shaft 12 will be described in detail, and the same reference characters, with the subscript "a," will be applied to the assembly associated with the output shaft 13.

Referring to Figure 2, the side wall of housing 21, slightly below the level of shaft 12, as seen in Figure 4, is provided with a longitudinally extending lubricant trapping or collecting trough 146, which is preferably inclined so as to be slightly lower at the front than at the rear, permitting slightly downward inclination of the transfer case, while maintaining the trough substantially horizontal. The lubricant collected in trough 146 is conducted in both directions to both the front and rear bearings for shaft 12.

At the front end trough 146 communicates with a duct 147 cored in the casing, which opens into the space between bearing 105 and cap 109 with the result that lubricant gravitates from the trough to the bearing, and passes through and lubricates the latter and drains back into the main body of lubricant in the housing. Trough 146 terminates at its rear end in a port 148, which is disposed in alignment with a similar port 149 in housing cover 23. Passage 149 communicates with a notch 151 in pilot flange 121 of ring 119, so as to deliver lubricant into the space between seal 118 and bearing 112, the lubricant passing through the bearing and returning to the bottom of the housing.

From the foregoing detailed disclosure it is apparent that the invention provides a transfer case embodying a sump type lubrication system, with a comparatively low oil level, making for minimum agitation, and as all of the shaft bearings are lubricated by lubricant trapping pockets and associated ducts, the lubrication system is not subject to appreciable variation in efficiency as a result of tilting the transfer case, as for instance when ascending or descending steep grades. It thereby insures an adequate flow of lubricant to all of the working parts at all times during operation and under all of the operating conditions usually met with in service.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a power transmitting mechanism, a housing; an input shaft and an idler shaft journalled in said housing for rotation about spaced parallel axes located in a common vertical plane; a pair of spaced, parallel output shafts journalled in said housing and having their axes disposed in a common horizontal plane which intersects said vertical plane intermediate the axes of said input and idler shafts to provide a substantially parallelogrammatic mounting of side shafts in the housing; a multiple speed gear mechanism for transmitting power from said input shaft to said idler shaft including a differential gear assembly on the idler shaft within said housing; and a gear on each output shaft in constant mesh with an independently driven gear element of said differential assembly for transmitting power from said idler shaft simultaneously to said output shafts.

2. In a transfer case, an input shaft and an idler shaft; a pair of output shafts; a shiftable gear mechanism for transmitting power from said input shaft to said idler shaft at either high speed or low speed; a second gear mechanism constantly driven by said first gear mechanism for transmitting power from said idler shaft to said output shafts, said second gear mechanism including a differential mechanism and means for locking out the differential; and shift means for substantially simultaneously shifting said differential into locked condition and shifting said first-named gear mechanism into the lower speed.

3. In a power transmitting mechanism, an input shaft and a pair of output shafts; a gear mechanism for transmitting power from said input shaft to said output shaft, comprising a two-speed selective mechanism for transmitting power at either high or low speed and a differential mechanism constantly driven by said selective mechanism for normally dividing the transmitted power equally between said output shafts, and embodying shiftable means for locking out the differential; and common means for shifting said two-speed mechanism into the low speed and actuating said differential locking means, comprising shifter rails associated with said two-speed mechanism and said differential locking means, a lever pivoted at its ends to said rails, and means for applying shifting forces to said lever intermediate its ends.

4. In a laterally compact power transmitting mechanism, an input shaft, a pair of radially spaced output shafts parallel to each other and to said input shaft, a gear mounted on said input shaft and adapted to be rotated thereby, a gear non-rotatably mounted on each output shaft, and means providing a power transmitting and dividing connection between said input shaft and said two output shafts for rotating both of said output shafts in the same direction comprising a driven gear in said means directly and constantly meshed with the gear on said input shaft and spaced coaxial output gears operatively coupled to said driven gear and disposed on opposite sides of said driven gear directly and constantly meshed with the gears on said output shafts.

5. In a multi-speed power transmitting and dividing mechanism, an input shaft and an idler shaft disposed in spaced parallel relation, a first pair of axially spaced gears of different size on said input shaft, selective means for drive-coupling either of said gears to said input shaft, a second pair of axially spaced gears on said idler shaft each constantly meshed with one of the gears on said input shaft, said meshed gear pairs providing different drive speeds in the same direction, a third pair of axially spaced gears carried by said idler shaft, power dividing means mounted on said idler shaft substantially in the axial space between said second pair of axially spaced gears, means operatively coupling said power dividing means with said third pair of gears on said idler shaft, a pair of spaced parallel output shafts arranged parallel to said idler and input shafts, and gears on said output shafts constantly meshed with said third pair of axially spaced gears on said idler shaft.

6. In the multi-speed power transmitting and dividing mechanism defined in claim 5, said power dividing means comprising a differential having a spider rigid with both of said second pair of axially spaced gears and non-rotatably mounted on said idler shaft, idler gears rotatably mounted on said spider, and a pair of side gears each constantly meshed with said idler gears and respectively rigid with one of said second pair of axially spaced gears on said idler shaft.

7. In a laterally compact power transmitting mechanism, an input shaft, an idler shaft and two output shafts all arranged in parallel spaced relation, a gear non-rotatably mounted on said input shaft and adapted to be driven thereby, a pair of spaced gears on said idler shaft, gears rigid with said output shafts directly and constantly meshed with said spaced gears on the idler shaft, and power dividing means mounted on said idler shaft in the axial space between said pair of spaced gears, a gear in said power dividing means directly and constantly meshed with said gear on said input shaft providing a direct drive connection between said input shaft and said power dividing means, and means operatively coupling said power dividing means to said pair of spaced gears for rotating said output shafts in the same direction upon rotation of said input shaft.

8. In a power transmitting mechanism, an input shaft, a spaced parallel rotatable idler shaft, a spaced pair of output shafts arranged in spaced parallel relation to said input and idler shafts, a differential spider non-rotatably mounted on said idler shaft, a gear rotatably mounted on said input shaft and adapted to be drive connected to said input shaft, a gear rigid with said spider constantly meshed with said gear on the input shaft, idler pinions rotatably mounted on said spider, a pair of axially spaced gears rotatably mounted on said idler shaft at opposite sides of said spider and directly driven by said idler pinions, and gears non-rotatably mounted on said output shafts constantly meshed with said axially spaced gears on said idler shaft.

9. In a power dividing and transmitting mechanism, an input shaft and two output shafts arranged in spaced parallel relation, differential means interconnecting said output shafts, change speed means having two different speeds connected for driving said differential means from said input shaft, and means for simultaneously selecting the lower of said speeds and locking said differential so that said output shafts are both positively driven in the same direction without torque equalization when said lower speed is selected and are driven in the same direction with substantially equalized torque when said higher speed is selected.

10. In the mechanism defined in claim 9, said speed selecting and differential locking means comprising axially movable clutch elements on said input and idler shafts, parallel shifter rails connected to said clutch elements and extending axially of said mechanism, a transverse floating yoke pivotally interconnecting said rails, and an actuator member pivotally connected to said yoke intermediate its ends.

11. In a multi-speed power transmitting and dividing mechanism, an input shaft, a first axially spaced pair of gears of different size on said input shaft adapted to be selectively driven by said shaft, a rotatable idler shaft, a differential spider non-rotatably mounted on said idler shaft, a second pair of axially spaced gears rigid with said spider and each constantly meshed with one of said gears on the input shaft, said meshed gear pairs providing different drive speeds, idler pinions rotatably mounted on said spider, side gears rotatably mounted on said idler shaft axially and constantly meshed with said idler pinions, a third pair of axially spaced gears on said idler shaft rotatably mounted on said idler shaft, a pair of parallel spaced output shafts parallel to said input and idler shafts, and a gear non-rotatably mounted on each of said output shafts constantly meshed with said third pair of axially spaced gears on said idler shaft.

12. In the mechanism defined in claim 11, a differential lockout arrangement comprising a clutch element slidably and non-rotatably mounted on said idler shaft, and a cooperating clutch element rigid with one of said third pair of axially spaced gears on said idler shaft.

13. In power transmitting mechanism, power input and output shafts and an idler shaft, all arranged in closely grouped parallel relation, a pair of spaced change speed gears in axially fixed relation on the input shaft and means for selectively establishing a driving connection between said gears and shaft, a spider fixed to the idler shaft intermediate said change speed gears, a gear directly secured to each side of said spider and in constant mesh with one of said change speed gears, gears rotatably mounted on the idler shaft each in close axial succession to one of the gears carried by said spider, gears fixed to the output shafts and in constant mesh with said last named gears, and gear mechanism connecting said rotatable gears on the idler shaft with said spider for transmitting rotation to the output shafts from said change speed gears at a selected driving speed.

14. In power transmitting mechanism, a housing, an input shaft, an idler shaft, and a pair of output shafts, end bearings for each shaft constituting the sole means supporting said shafts in closely grouped parallel relation in the housing, a pair of change speed gears in axially fixed spaced relation on said input shaft and means for selectively establishing a driving connection between said gears and shaft, a differential spider fixed to the idler shaft intermediate said change speed gears, gears secured to each side of said spider with one in constant mesh with one of said change speed gears, a pair of gears rotatably mounted on the idler shaft respectively in close axial succession to one of the gears carried by said spider, pinions journalled in the spider, side gears connected with each gear on the idler shaft in constant mesh with said pinions, and a gear fixed to each output shaft and in constant mesh with one of the gears on the idler shaft.

LAWRENCE R. BUCKENDALE.

REFERENCES CITED

The following references are of record in the file of this patent:

UNITED STATES PATENTS

| Number | Name | Date |
|---|---|---|
| 885,505 | McComb | Apr. 21, 1908 |
| 1,090,411 | Remy et al. | Mar. 17, 1914 |
| 1,295,335 | Littlejohn | Feb. 25, 1919 |
| 1,306,065 | Kane | June 10, 1919 |
| 1,431,960 | Keim | Oct. 17, 1922 |
| 1,480,856 | Enochs | Jan. 15, 1924 |
| 1,506,755 | Keim | Sept. 2, 1924 |
| 1,629,518 | Martin | May 24, 1927 |
| 1,652,358 | Heider | Dec. 13, 1927 |
| 1,742,744 | Wyman | Jan. 7, 1930 |
| 2,027,012 | Barnes | Jan. 7, 1936 |
| 2,032,318 | Herrington | Feb. 25, 1936 |
| 2,158,320 | Bock | May 16, 1939 |
| 2,183,667 | Buckendale | Dec. 19, 1939 |
| 2,190,924 | Joy | Feb. 20, 1940 |
| 2,219,249 | Blagden et al. | Oct. 22, 1940 |
| 2,308,351 | Blagden et al. | Jan. 12, 1943 |
| 2,309,441 | Cook | Jan. 26, 1943 |